United States Patent [19]

Konersmann et al.

[11] 3,894,429

[45] July 15, 1975

[54] NOISE CHECKING INSTALLATION FOR TWO ROTATING AND INTERENGAGING GEARS

[75] Inventors: Erhard Konersmann, Zurich; Rudolf Gruber, Bichelsee, both of Switzerland

[73] Assignee: Werkzeugmaschinenfabrik-Oerlikon Buhrle AG, Zurich, Switzerland

[22] Filed: July 22, 1974

[21] Appl. No.: 491,167

[30] Foreign Application Priority Data
July 31, 1973  Switzerland.................. 11127/73

[52] U.S. Cl. ................................................ 73/162
[51] Int. Cl. ........................................... G01m 13/02
[58] Field of Search...................... 73/162, 67.2, 69; 33/179.5, 174 R

[56] References Cited

UNITED STATES PATENTS

| | | | |
|---|---|---|---|
| 1,981,693 | 11/1934 | Firestone et al. | 73/162 |
| 3,127,767 | 4/1964 | Kamp | 73/162 |

*Primary Examiner*—Donald O. Woodiel
*Attorney, Agent, or Firm*—Werner W. Kleeman

[57] ABSTRACT

A noise checking installation for two rotating and interengaging gears at a gear testing machine at which the gears are displaceable relative to one another in the direction of their axes of rotation. Elements are provided for measuring the sound in liquid as a function of the axial displacement of the gears for a predetermined meshing frequency of the gears and for a predetermined rotational moment and which elements are connected with hydrostatic bearings of the shafts carrying the gears.

12 Claims, 1 Drawing Figure

3,894,429
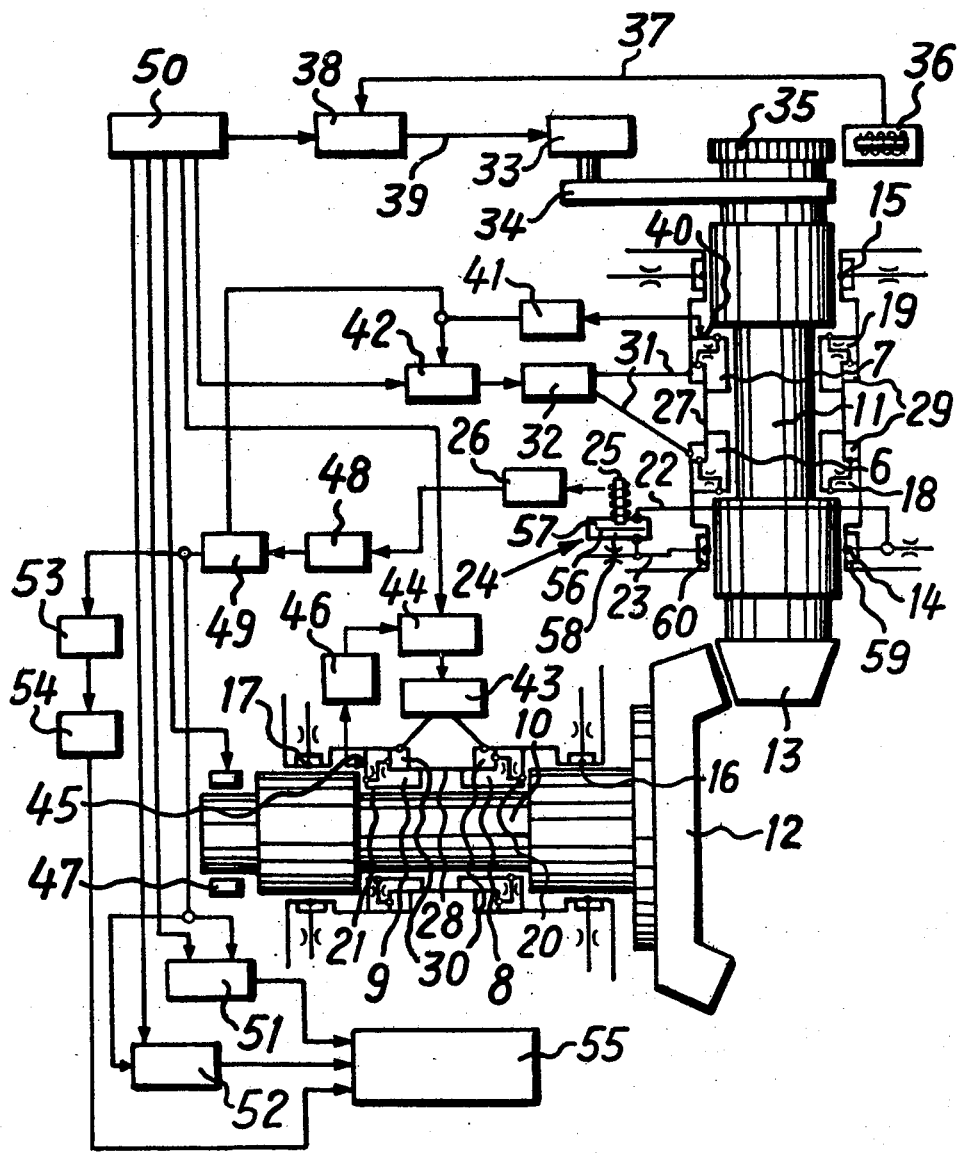

NOISE CHECKING INSTALLATION FOR TWO ROTATING AND INTERENGAGING GEARS

BACKGROUND OF THE INVENTION

The present invention relates to a noise checking installation for two rotating and interengaging gears at a gear testing machine at which the gears are displaceable relative to one another in the direction of their axes of rotation.

An apparatus of this type is known to the art wherein for determining the quietness of running of the gears there is carried out an air sound measurement with the aid of a microphone arranged at the neighborhood of the gears. Furthermore, there is known to the art another apparatus in which for judging the quietness of running of the gears there is carried out a body sound measurement with the aid of peizoelectric transducers.

It is a drawback during the measurement of the sound in air and the sound in the body that disturbing factors are difficult to eliminate. The air sound measurement is influenced by the surrounding noises and requires special measurement areas or spaces. The body sound measurement is independent of the surrounding noises, however is influenced by other oscillations at the gear testing machine.

SUMMARY OF THE INVENTION

It is a primary object of the present invention to provide a new and improved construction of sound checking installation for the reliable determination of the quietness of running of two meshing gears wherein the aforementioned disturbance factors can be eliminated.

Another object of the present invention aims at a new and improved construction of sound checking installation for two rotating and interengaging gears and which installation is relatively simple in construction and design, extremely reliable in operation, and provides for accurate determination of the noise factor during running of gears.

Now in order to implement these and still further objects of the invention, which will become more readily apparent as the description proceeds, the invention contemplates the provision of elements for measuring the sound in liquid as a function of the axial displacement of the gears for a predetermined meshing frequency of the gears and for a predetermined rotational moment, and which elements are connected to hydrostatic bearings of the shafts carrying the gears.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing illustrates an exemplary embodiment of noise checking installation for two rotating interengaging gears as contemplated by the invention.

DETAILED DESCRIPTION OF THE PREFERRED EMBODIMENTS

Describing now the drawing, according to the single Figure thereof two shafts 10 and 11 are arranged essentially perpendicular to one another at a not further illustrated gear testing machine. A pinion 13 is secured to shaft 11 and a spur bevel gear 12 to the other shaft 10. Both of shafts 11, 10 are mounted in two respective hydrostatic radial bearings, 14, 15 and 16, 17 and in two respective hydrostatic axial bearings 18, 19 and 20, 21. Two oppositely situated pressure oil pockets 59, 60 of the one radial bearing 14, in which there is mounted the shaft 11 carrying the pinion 13, are connected to conduits or lines 22 and 23 which lead to a differential pressure transmitter or pick-off 24. The differential pressure transmitter 24 possesses in conventional manner two compartments or chambers 57, 58 which are separated from one another by a membrane or diaphragm 56. The compartment 57 is connected with the conduit 22, the other compartment 58 with the conduit 23. The movements of the diaphragm 56 are transmitted via an inductive measurement value transmitter or sensor 25 to an amplifier 26.

The axial bearings 18, 19, 20, 21 are arranged at a respective displaceable piston ring 6, 7, 8, 9. The piston rings 6, 7 at the shaft 11 are located in a housing 27, the piston rings 8, 9 at the shaft 10 in another housing 28. Between the housing 27 and the piston rings 6, 7 there are provided ring-shaped or annular pressure oil compartments 29, between the other housing 28 and the piston rings 8, 9 there are provided further ring-shaped or annular pressure oil compartments 30. The pressure oil compartments 29 are connected via conduits 31 with a servo valve 32.

The shaft 11 is driven through the agency of a transmission or gearing 34 by a motor 33. At the shaft 11 there is secured a gear 35 which in conjunction with an inductive measurement value transmitter 36 serves to determine the rotational speed of the shaft 11. The inductive measurement valve transmitter 36 is connected via a conductor or line 37 with a regulator 38 which is coupled through the agency of a conductor 39 with the motor 33 for regulating the rotational speed.

At the piston ring 7 associated with the shaft 11 there is secured an inductive measurement value transmitter or sensor 40 which transmits the axial displacement of the shaft 11 relative to the housing 27 to a distance or displacement measuring device 41. The displacement measuring device 41 is connected via an amplifier 42 with the servo valve 32 for regulating the axial position of the shaft 11.

In analogous manner there is also secured at the piston ring 9 associated with the shaft 10 an inductive measurement or measuring value transmitter or sensor 45 which transmits the axial displacement of the shaft 10 relative to the housing 28 to a distance or displacement measuring device 46. The distance measuring device 46 is connected via an amplifier 44 with a servo valve 43, at which there are connected the pressure oil pockets 30, for regulating the axial position of the shaft 10. At the rear end of the shaft 10 there is arranged a brake 47 for generating a certain rotational moment at the shaft 10.

The amplifier 26, which is coupled with the differential pressure transmitter or pick-off 24 is furthermore coupled via a filter 48 with a recorder 49. The recorder 49 is connected with a differentiating mechanism or differentiator 53 for differentiating the function of the noise plotted by the recorder 49 as a function of the axial position of the shaft 11. At the differentiating mechanism 53 there is connected a further device 54 for determining the null value of the differentiated function. This mechanism 54 is furthermore coupled with an electronic evaluation device 55.

The testing machine possesses a control mechanism 50. For adjusting and maintaining a certain reference rotational speed of the pinion 13 the control mechanism 50 is connected with the regulator 38. For adjusting a predetermined axial position of both shafts 10 and 11 the control mechanism 50 is coupled via both amplifiers 44, 42 with both of the servo valves 43, 32. For maintaining such axial position there are provided the previously mentioned distance or displacement measuring devices 46, 41. Furthermore, the control mechanism 50 is coupled with the brake 47 for generating a certain rotational moment.

Additionally, two devices 51, 52 are connected with the control mechanism 50 for comparing the measured running noise with the permissible maximum noise level for the forward and reverse running of both gears 12, 13. Both of these devices 51, 52 are coupled with the recorder 49 and connected with the electronic evaluation device 55.

Having now had the benefit of the foregoing discussion of the noise checking installation contemplated by the invention its mode of operation will now be considered and is as follows: Corresponding to a certain meshing frequency and corresponding to the number of teeth of the relevant gearing or transmission there is imparted from the control 50 a reference value-rotational speed to the shaft 11 via the regulator 38, the motor 33 and the gearing or transmission 34. In a concrete case the reference value-rotational speed is selected such that independent of the momentary number of teeth there always results the same meshing frequency. The actual-value of this rotational speed is measured in a contactless fashion via the inductive measurement value transmitter 36 and is regulated by means of the regulator 38. By means of the control 50 there are produced at the shaft 10 via the brake 47 certain braking moments, and thus certain loads are transmitted to both of the gears 13, 12. The mechanical oscillations of both gears 13, 12 are transmitted through the agency of both shaft 11, 10 to the hydrostatic bearings 14, 15, 18, 19 and 16, 17, 20, 21. In the corresponding pressure oil pockets there prevail small pressure fluctuations both in the radial as well as also in the axial directions of both shafts 11, 10. According to the exemplary embodiment the pressure fluctuations in two diametrically oppositely situated pressure oil pockets 59, 60 of the radial bearing 14 of the shaft 11 are converted by means of the sensitive difference pressure transmitter or sensor 24, the inductive measurement value transmitter 25 and the amplifier 26 into proportional electrical voltages or voltage signals, which for the given meshing frequency constitute a measure of the quietness of running of the gears or transmission. In analogous manner it would be possible by means of the difference pressure transmitter or pick-off 24 to convert pressure fluctuations in two pressure oil pockets of one of the axial bearings 18, 19 of the shaft 11 into electrical signals. It is equally possible to transmit with the aid of a pressure transmitter also pressure fluctuations only in one pressure oil pocket of one of the bearings 14, 15, 18, 19.

By means of the inductive measurement value transmitters 40 and 45 which are arranged at the axial bearings 19 and 21 there are transmitted the axial displacements of both shafts 11, 10 to the distance or displacement measuring devices 41 and 46. By means of the displacement measuring devices 41 and 46 the axial position of both shafts 11, 10 are regulated via the amplifiers 42, 44 and the servo valves 32, 43. The pressure fluctuations which are converted by the distance or displacement measuring device 41 and the differential or difference pressure transmitter 24 into voltage fluctuations are delivered to recorder 49 which plots the running noise occurring due to oscillations of the shaft 11 as a function of the axial position of such shaft 11. This function is differentiated in the differentiator device 53 and there is determined the minimum value of such function by hull-setting the derivative at the mechanism 54. The corresponding value of such minimum value both during forward running as well as also during reverse running of the gears is further transmitted to the electronic evaluation device 55.

The noise level during reverse running and forward running of both gears 13, 12 is compared at the comparator devices 51, 52 with the maximum permissible values during forward and reverse running, and which are given by the control 50. The comparative values are transmitted to the evaluation device 55.

If the minimum noise level determined by the device 54 is smaller than the maximum permissible noise level, then the installation or mounting dimension corresponding to the minimum noise value is inscribed or otherwise suitably applied by the evaluation mechanism or device 55 at the pinion 13.

In the event that the minimum noise value is greater than the maximum permissible noise level then the relevant gearing or transmission is rejected as unsuitable.

While there is shown and described present preferred embodiments of the invention, it is to be distincly understood that the invention is not limited thereto, but may be otherwise variously embodied and practiced within the scope of the following claims.

Accordingly, What is claimed is:

1. A noise checking installation for two rotating and interengaging gears at a gear testing machine, each of said gears having a shaft, means for mounting said gears to be displaceable relative to one another in the direction of their axes of rotation, said mounting means for the gears including hydrostatic bearings provided for the gear shafts, means for measuring the liquid noise as a function of axial displacement of the gears for a given meshing frequency of the gears and for a given rotational moment, and means for operatively connecting the measuring means with the hydrostatic bearings of said shafts which carry the gears.

2. The noise checking installation as defined in claim 1, wherein said measuring means comprises a differential pressure transmitter equipped with two compartments, a diaphragm for separating said two compartments from one another, said hydrostatic bearings incorporating a hydrostatic radial bearing provided for at least one shaft carrying one of the gears, said hydrostatic radial bearing being equipped with pressure oil pockets situated approximately diametrically opposite one another, and means for connecting each compartment with one of said pressure oil pockets.

3. The noise checking installation as defined in claim 2, further including an electrical measurement value transmitter operatively connected with said diaphragm and serving to convert oscillations of the diaphragm into electrical signals.

4. The noise checking installation as defined in claim 1, wherein said mounting means for at least one of said shafts carrying the associated gear comprises a housing, said hydrostatic bearings incorporating two hydrostatic axial bearings for mounting said housing to be axially displaceable, a substantially ring-shaped piston provided for each hydrostatic axial bearing, said ring-shaped pistons being equipped with ring-shaped pressure oil pockets between the housing and said ring-shaped pistons, means including a servo valve for the axial displacement of said at least one shaft, and conduit means for operatively connecting said pressure oil pockets with said servo valve.

5. The noise checking installation as defined in claim 4, further including a control element for controlling the axial displacement of said at least one shaft, said servo valve being connected via an amplifier means with said control element.

6. The noise checking installation as defined in claim 5, further including a distance measuring value transmitter for measuring the axial displacement of said at least one shaft relative to its housing, a distance measuring device, said distance measuring value transmitter being operatively coupled via said distance measuring device and said amplifier means with said servo valve for correcting the actual position of said one shaft relative to a position prescribed by the control element.

7. The noise checking installation as defined in claim 1, wherein said mounting means for each of said gears comprises a housing, said hydrostatic bearings comprising two respective hydrostatic axial bearings for mounting each shaft carrying the associated gear so as to be axially displaceable in the associated housing, each axial bearing being equipped with a substantially ring-shaped piston possessing substantially ringshaped pressure oil pockets between the associated housing and the associated piston, and wherein the two respective pressure oil pockets associated with each of the shafts are coupled with a respective servo valve for the axial displacement of both shafts.

8. The noise checking installation as defined in claim 4, further including an electrical measurement value transmitter operatively connected with said diaphragm for converting oscillations of the diaphragm into electrical signals, means for recording the liquid sound converted into electrical signals as a function of the axial displacement of said at least one shaft carrying the gear, said recording means including a filter and a recorder, a differentiating mechanism for determining the minimum of said function, and a further mechanism for determining the null value of the differentiated function.

9. The noise testing installation as defined in claim 1, further including regulator means for maintaining constant the meshing frequency, said regulator means incorporating an inductive measurement value transmitter for measuring the rotational speed of an associated one of said shafts, and a regulator operatively connected with a motor for driving said lastmentioned shaft.

10. The noise checking installation as defined in claim 1, means for driving one of said shafts, the other of said shafts carrying the gear which is driven, a brake mounted at the shaft carrying the driven gear for generating a certain rotational moment.

11. The noise checking installation as defined in claim 2, wherein said hydrostatic bearings include hydrostatic axial bearings, means for operatively connecting the differential pressure transmitter to one of said hydrostatic axial bearings.

12. The noise checking installation as defined in claim 2, wherein said measuring means comprises a pressure transmitter operatively coupled with a pressure oil pocket of one of the hydrostatic bearings of said at least one shaft carrying the gear.

* * * * *